United States Patent Office 3,834,973
Patented Sept. 10, 1974

3,834,973
APPARATUS FOR FABRICATING MODULAR WALL SECTIONS
Jack A. C. Kummerow, Toledo, Ohio, assignor to S. A. Storer & Sons Company, Toledo, Ohio
Filed Jan. 2, 1973, Ser. No. 320,074
Int. Cl. B32b *31/04;* E04g *21/22*
U.S. Cl. 156—558                                  12 Claims

ABSTRACT OF THE DISCLOSURE

An apparatus and method for automatically fabricating modular sections of masonry type walls. The apparatus and method constitute improvements over those disclosed and claimed in Storer U.S. Pat. No. 3,585,092 of June 15, 1971. The specific apparatus has means for feeding concrete blocks in selected sequence onto a lineally movable course shuttle and for applying head and bed mortar to the blocks of the course and to the course. Clamp and pressure mechanisms set the head mortar to provide courses of uniform length, in sequence. Each course is then elevated as a unit against the underside of a previously assembled course. Means are provided to enable blocks of different wall thickness to be assembled and to assemble and set the joints of both half-bond and stack-bond wall modules and to leave voids for windows and doors where desired. The method comprises a sequence of steps by which the courses are assembled, mortar is applied, the course is made uniform in length and then is elevated into contact with the underside of a previous course, thus building the wall section from the top down.

BACKGROUND OF THE INVENTION

The apparatus and method of the instant invention constitute improvements over the apparatus and method disclosed and claimed in Robert L. Storer, U.S. Pat. 3,585,092 of June 15, 1971. The Storer patent teaches the fabrication of modular sections of walls by sequentially fabricating individual courses, for example, of concrete blocks or bricks, spreading the head mortar and bed mortar layers and moving each assembled course into position against the underside of a previously assembled course to build the wall module from the top down.

The present invention comprises improvements over the basic apparatus and method by which the fabrication of the modular wall sections is made automatic or semi-automatic. Furthermore, the apparatus and method of these improvements may be utilized to produce half-bond wall modules with the inter-unit head joints staggered or stack bond wall modules with the head joints vertically aligned. In addition, when desired, openings may be left for windows or doors or other purposes.

Ultimately, the present invention comprehends programming by the provision of control mechanism which may be set to actuate the various sub-assemblies to repetitively produce identical wall modules or different wall modules, as desired.

DESCRIPTION OF PREFERRED EMBODIMENT

Figures 1, 6, 7, 8:
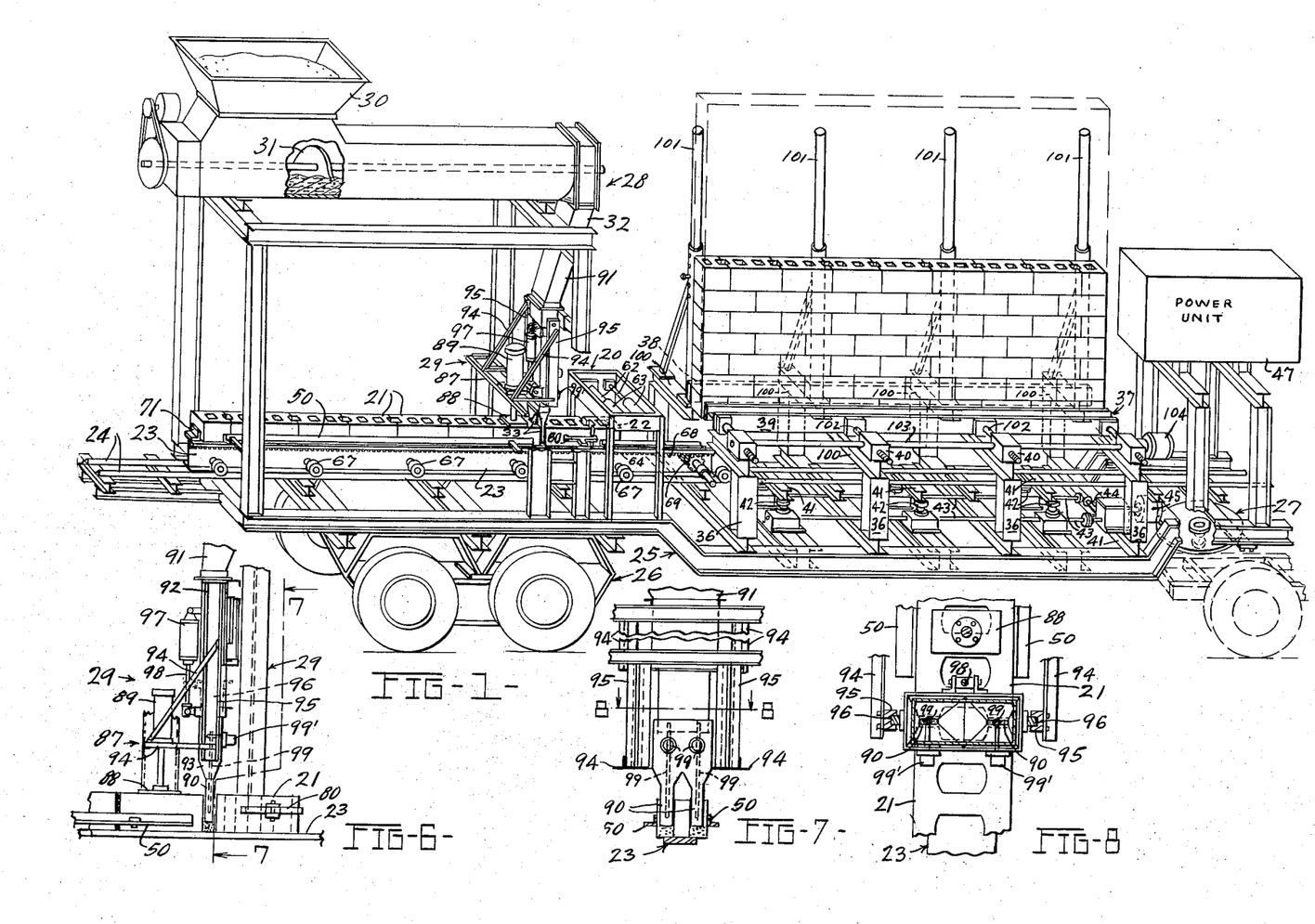
FIG. 1 is a simplified view in perspective showing an apparatus embodying the invention as mounted on a trailer or the like for the production of modular wall sections by the practice of the invention at an erection site.
FIG. 6 is a fragmentary, detailed view in side elevation showing the mortar feeding mechanism.
FIG. 7 is a fragmentary, vertical view of the mechanism shown in FIG. 6 taken from the position indicated by the line 7–7 of FIG. 6.
FIG. 8 is a horizontal, sectional view taken along the line 8–8 of FIG. 7.
Figure 2:
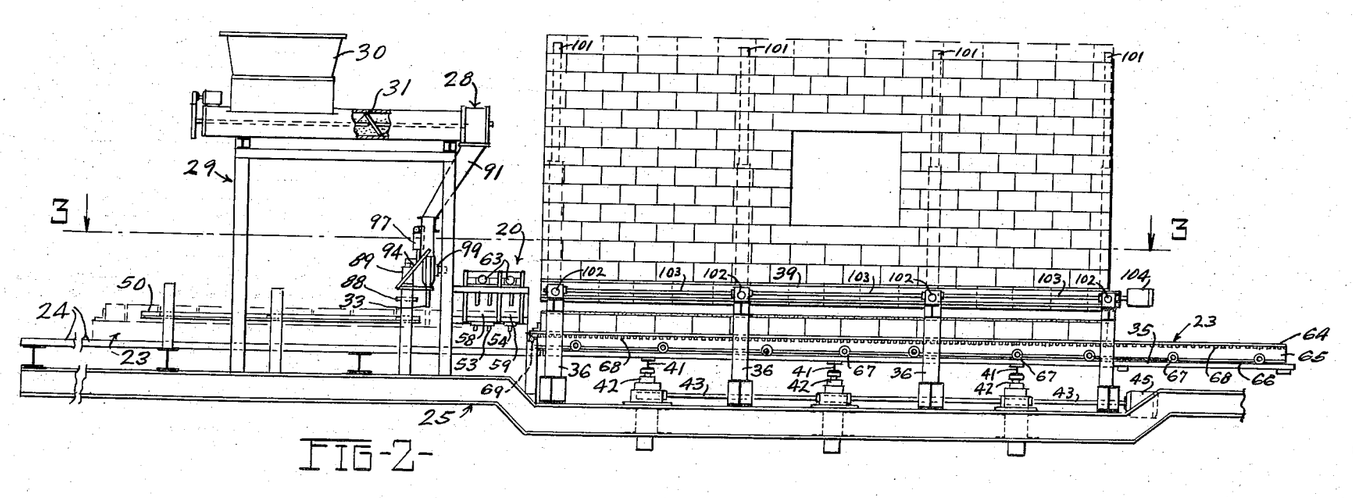
FIG. 2 is a side view in elevation of an apparatus embodying the invention as positioned in a central factory, the structure embodying the invention being substantially identical with that shown in FIG. 1.
Figure 3:
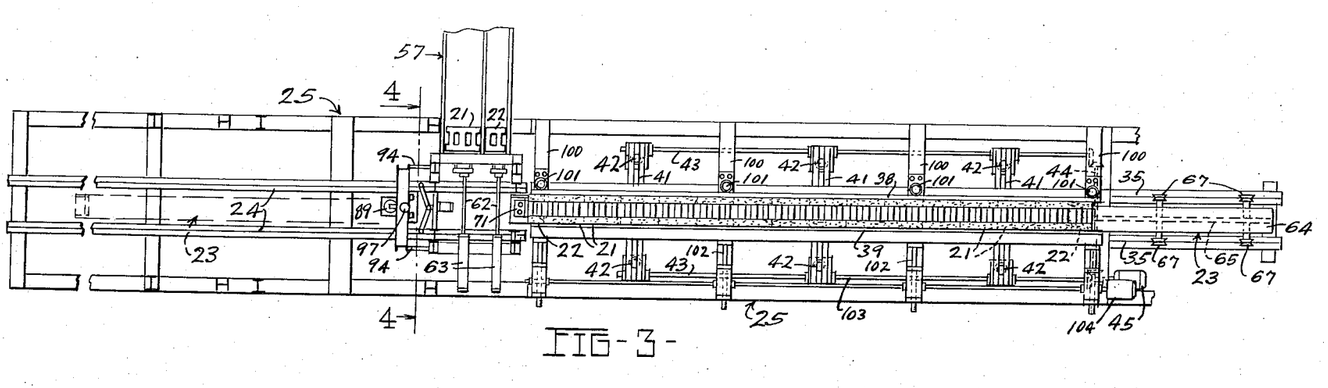
FIG. 3 is a horizontal plan view of the apparatus shown in FIG. 2.

FIGS. 1, 2 and 3 illustrate an entire apparatus embodying the invention and are primarily intended for reference purposes in discussing the functioning of various sub-assemblies of this apparatus and in explaining the details of the method according to the invention and which readily can be carried out upon apparatus constructed as shown in FIGS. 1, 2 and 3.

Figure 5:
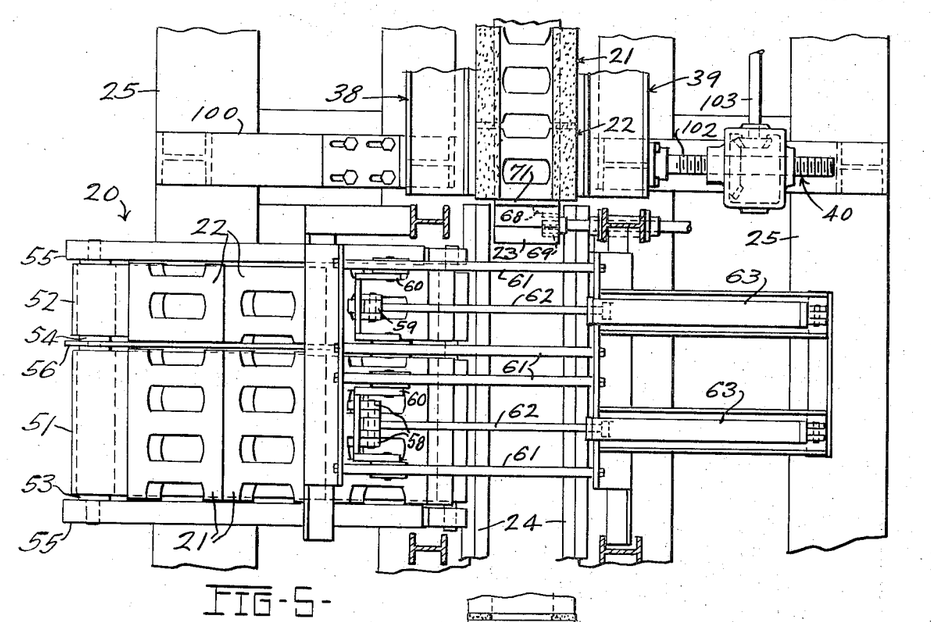
FIG. 5 is a fragmentary, horizontal sectional view taken from the position indicated by the line 5–5 of FIG. 4.

An apparatus embodying the invention has a number of major sub-assemblies including a unit feeding mechanism generally indicated by the reference number 20 by which, in the illustrated embodiment, full-size concrete blocks 21 (see also FIG. 5) and half-size concrete blocks 22 are sequentially fed onto an individual course shuttle generally indicated by the reference number 23. The shuttle 23 moves back and forth on a track 24 which is supported by a base frame generally indicated by the reference number 25.

In FIG. 1 the base fram 25 is mounted upon a trailer suspension 26 and may be provided with a fifth wheel adapter, generally indicated by the reference number 27, at its front end. Alternatively, the base frame 25 may be positioned on stationary structural members at a central location such as a wall section factory. It will be appreciated, of course, that the particular base frame upon which the apparatus embodying the invention is mounted does not constitute a specific part of the instant invention and it is thus shown in the two alternative arrangements in FIG. 1 and FIGS. 2 and 3, respectively, to illustrate how apparatus embodying the invention may be positioned in the central factory or carried to a construction site. The mounting of an apparatus on a trailer, as shown in FIG. 1, may be desirable when, for example, a large group of similar buildings is being erected as in a real estate development, condominium grouping or the like, and the apparatus of the invention is employed for the fabrication of modular sections for basement walls, garage walls, etc.

Apparatus embodying the invention also comprises a mortar supplying mechanism 28 erected on an overhead frame 29 which includes a hopper 30 for containing of a large supply of pre-mixed mortar, feeding means such as a screw 31 or the like, a mortar chute 32 and a twin mortar nozzle 33. The manner of actuation of the mortar supplying mechanism 28, both to inject head-joint mortar between adjacent ends of individual blocks 21 and 22 and also to spread a pair of parallel layers of bed mortar over all of the blocks 21 and 22 composing a single course, will be later described in detail.

The course shuttle 23 is intermittently moved backwardly (to the left in FIGS. 1, 2, and 3) and in sequence with the deposition thereon of the full-size and half-size blocks 21 and 22, by drive mechanism later to be described but including an indexing motor 34 (see FIG. 4).

The shuttle tracks 24 extend beneath the unit feeding mechanism 20 and the motor supplying mechanism 28 and also extend forwardly and are aligned with similarly spaced shuttle tracks 35 which lie between uprights 36 of a clamping and elevating mechanism generally indicated by the reference number 37. The clamping and elevating mechanism 37 comprises two parallel side clamps 38 and 39. The side clamp 38 is selectively positioned at either of two places horizontally and the side clamp 39 is carried by a plurality of clamping jacks 40.

The second shuttle tracks 35 are mounted by cross beams 41 (FIGS. 2, 3, and 4) which are in turn supported at their ends on elevating jacks 42. The elevating jacks 42 are coupled for simultaneous action by longitudinally extending drive shafts 43, a cross shaft 44 driven by a motor 45.

When apparatus embodying the invention is mounted on a portable frame as illustrated in FIG. 1, a power unit generally indicated by the reference number 47 is also carried by the frame 25 and comprises electric generating apparatus, hydraulic or pneumatic pumps and electrical controls for sequencing the actuation of the various mechanisms which make up an apparatus embodying the invention and the operation of which carries out the method of the invention.

GENERAL OPERATION

In general the operation of apparatus embodying the invention and according to the method of the invention comprises sequential steps by which the individual units, whether they be full-size blocks 21 or half-size blocks 22, or similar units such as bricks, are fed onto the course shuttle 23 by the unit feeding mechanism 20, head joint mortar is spread between adjacent units, the units are assembled in an individual course, bed mortar is spread on the upper surface of the course, the course is moved to position beneath previously assembled courses and the course is raised upwardly into contact with the next preceding course in order to gradually build the wall from the top down.

The unit feeding mechanism 20 is sequenced according to the desired module to be built so that it feeds either a series of full-sized blocks 21 into each course (if the wall is to be a stack bond wall) or if the wall is to be a half-bond wall, for alternate courses feeds full-sized blocks 21 and for intermediate courses feeds a half-size block 22 followed by a series of full-size blocks 21 and a final half-size block 22 to complete the course. Each of the individual blocks 21 or 22 is fed by the unit feeding mechanism from a source, onto the shuttle 23 and the shuttle 23 is indexed by its indexing motor 34 an appropriate length to the left (FIGS. 1, 2 and 3) and stopped. After a second block has been placed on the shuttle it indexes again. The mortar supplying mechanism 28 is actuated to feed mortar downwardly out of the nozzle 33 in two narrow, vertical webs intermediate the end faces of two adjacent blocks. The preceding block is held in place by a clamping mechanism 48 and a squeezing mechanism 49 (FIGS. 9–12) which will later be described in detail, is actuated to squeeze the succeeding block against the vertical webs of mortar between it and the end face of the preceding block so that the unit distance between the corresponding faces (both right faces FIG. 9, for example) is set. In most instances where concrete blocks are employed, the unit distance is 16 inches allowing ⅜ inch for the mortar with a standard concrete block 15 and ⅝ inches long. A half unit distance is 8 inches allowing 7 and ⅝ inches for the half block and ⅜ inch head mortar. In a half bond wall, the indexing provides for the first half block of the intermediate courses to be fed alone, followed by the feeding of full size blocks, and for the feeding of the last full size block and the last half block simultaneously.

After this unit distance has thus been established, the shuttle 23 is indexed an additional time for each successive block for each deposition of head joint mortar and each squeezing of the mortar joint to establish the basic 16 inch spacing between corresponding edges of successive blocks. After the desired number of blocks 21 or 22 have been thus deposited on the shuttle 23, the head mortar joints spread therebetween and the modular 16 inch distance established, the shuttle 23 is filled with a sufficient number of blocks to constitute a single course for the modular wall section being built. If the first course thus built consists entirely of full size blocks 21 or if it is an intermediate course in a half-bond wall section, the course is then completed. If, on the other hand, a half-bond module is being fabricated when the individual course being assembled includes a half-size block 22 at its end, then the unit feeding mechanism 20 is sequenced to feed, first, a half-size block 22 followed by a series of full-size blocks 21 and, finally, a half-size block 22 at the end of the course. The mechanism of FIGS. 9–12 is similarly actuated to squeeze half-size blocks when they are placed.

After the entire course, whether half-bond or stack-bond, has been assembled on the shuttle 23 and/or the final half-size block 22 has been emplaced, the mechanism 49 shown in FIGS. 9–12 firms up the final block. Upon completion of the individual course, the indexing motor 34 is actuated to drive the shuttle 23 along the tracks 24 and onto the second set of tracks 35 of the clamping and elevating mechanism 37.

As the shuttle 23 moves from its far left position (FIGS. 1–3), the mortar supplying mechanism 29 is actuated to spread two ribbons of mortar for the bed joint along the top faces of all of the blocks 21 and/or 22 making up the individual course. However, if the course just completed is the first or top course of the wall section, there are no previous courses, so the mortar supplying mechchanism 29 is not actuated to spread a pair of ribbons of mortar along the top face of the course.

Upon arrival of the shuttle 23 and the course in position between the clamping and elevating mechanism 27, the shuttle 23 stops. The elevating jacks 42 are driven to raise the cross beams 41 (FIG. 4) and the tracks 35, lifting the shuttle 23 upwardly a distance in excess of the height of a single course. In most instances, where standard concrete blocks are employed, the vertical height of a block is 7 and ⅝ inches so that the course height is 8 inches including a ⅜ inch bed joint layer of mortar.

If the course being elevated at this point is the upper most or first course of a modular wall section, there is no bed mortar layer on its upper faces and there is no previously assembled course into contact with which it is brought by elevation. However, if the course now being elevated is the second or following course of a wall section, the strips of mortar of the bed joint lying on top of the course in question are brought into contact with the undersurface of a previously assembled course.

If the course being assembled is the uppermost course, and does not contact the previously assembled course, it is elevated the full height by the elevating jacks 42 and then the clamping jacks 40 are actuated to squeeze the movable side clamp 39 against the front face of the course and to position it backwardly against the stationary side clamp 38 thus establishing the vertical plane of the back face of the modular wall section and, as a result, "truing-up" the course. The course thus elevated and clamped is held at that position and the elevating jacks are actuated to lower the course shuttle 23 to its lower-most position.

As mentioned above, each successive course has its bed joint spread over its upper surface, is brought into position in the clamping and elevating mechanism 37 and elevated upwardly by the elevating jacks 42. When the course is the second or any succeeding course in a modular wall section, the elevating jacks 42 move the course upwardly into contact with the under surface of a previously assembled course, stopping when the vertical distance between the lower faces of the two superposed courses reaches 8 inches. The clamping jacks 40 are released and the weight of all preceding courses is now supported on the course shuttle 23 and, through it and its tracks 35, on the cross beams 41 and the elevating jacks 42.

As soon as contact has firmly been established between the now lowermost course and the lowest of the preceding courses, the elevating jacks 42 are further actuated to raise the entire group of courses upwardly one course distance. When the elevating jacks 42 reach the uppermost limits of their travel, the lowermost course has now been moved upwardly a full course distance plus a sufficient distance for clearance to allow a subsequent course to move in beneath it, and the clamping jacks 40 are again actuated to clamp this lowermost course and to support the assembled group of courses. The jacks 42 are actuated to lower the shuttle 23 down to its lower position and the motor 34 is actuated to drive the shuttle backwardly a distance sufficient so that its trailing end (left end FIGS. 1–3) is positioned to receive the first full-size block 21 or half-size block 22 of the next course to be assembled.

The sequence of operations described continues until all of the courses of the modular wall section have been assembled to the predetermined height.

If, on the other hand, a wall section such as that shown in FIG. 2 is to be constructed wherein an opening for a window, door or other purpose is to be left, the sequencing of the movement of the shuttle 23 and actuation of the unit feeding mechanism 20 is so controlled that the shuttle is moved a sufficient distance to provide the width of the opening in each of the successive courses in which the opening is to appear and the unit feeding mechanism is not actuated. Similarly, of course the mortar supplying mechanism 29 is not actuated during the provision of the gaps in each course to provide the opening. Thus each of the courses which is interrupted to provide the opening, is handled as if it were two short courses even though they are both assembled on the shuttle 23 during a single excursion of the shuttle 23 beneath the unit feeding mechanism 20 and the mortar supplying mechanism 29.

As will also be later described in detail, the clamping and elevating mechanism 37 can be adjusted horizontally to vary the gap between their opposed elements so as to accommodate blocks having 8 inch thickness or 12 inch thickness. Similarly side rails 50 for the shuttle can be set in either of two positions to line up blocks of two different thicknesses during course assembly.

UNIT FEEDING MECHANISM

The unit feeding mechanism 20 (see FIGS. 4 and 5) is positioned adjacent to and at a level above the shuttle 23 on the tracks 24 in order to feed full-size blocks 21 or half-size blocks 22 onto the shuttle 23 as desired for the particular course being assembled. The mechanism 20 has two feeding belts, a wider belt 51 for full-size blocks 21 and a narrower belt 52 for half-size blocks 22. The two belts 51 and 52 are mounted on pairs of spaced drums 53 and 54, respectively, which are coaxially aligned and rotatably mounted in parallel frames 55 and 56 that extend at right angles to the line of movement of the shuttle 23 and are inclined upwardly so that the off-ends of the feeding belts 51 and 52 are above the level of the shuttle 23. The outer ends of the feeding belts 51 and 52 are adjacent the ends of auxiliary conveyors fragmentarily indicated by the reference number 57 (FIG. 4) which feed blocks 21 or 22, respectively, onto the elevating belts 51 and 52. The auxiliary conveyors 57 can be intermittently energized either manually or by simple electric controls in order to replace each block 21 or 22 on its respective feeding belt 51 or 52 as a block 21 or 22 is fed off the upper end of its feeding belt onto the shuttle 23.

The actual feeding of the blocks 21 or 22 off of the upper end of the feeding belt 51 or 52 is accomplished by the respective one of a pair of one-way feeding dogs 58 and 59 each of which depends from the end of a roller slide 60, which travels back and forth across above the shuttle 23 on horizontal tracks 61. The roller slides 59 are connected to the ends of piston rods 62 of a pair of actuating cylinders 63.

Figure 4:
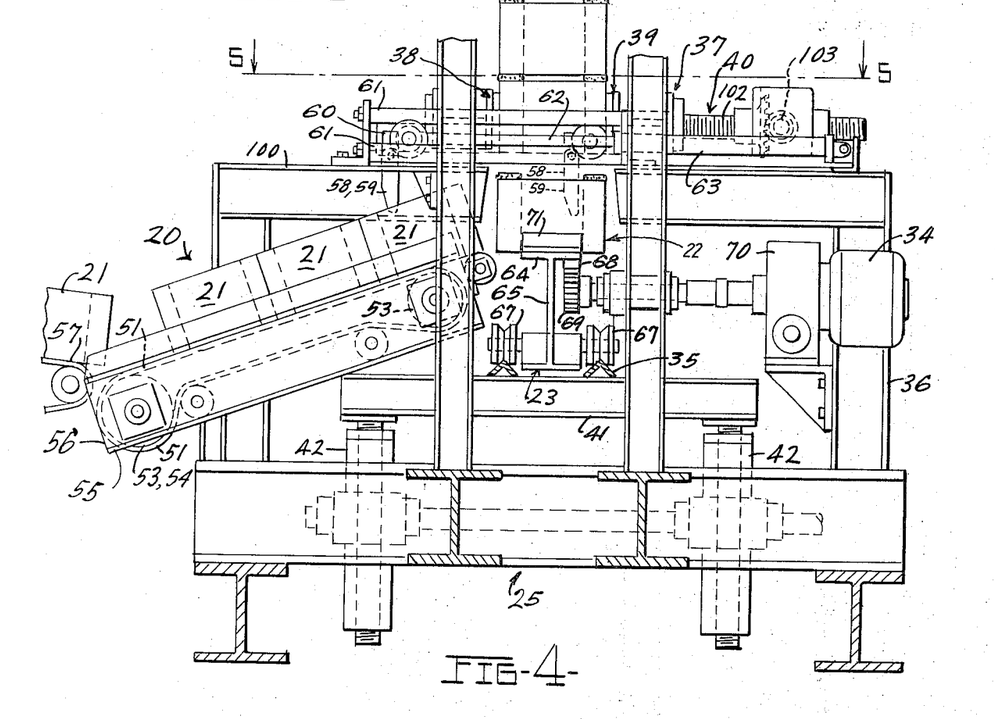
FIG. 4 is a fragmentary, vertical, sectional view taken from the position indicated by the line 4–4 of FIG. 3 and being shown on a greatly enlarged scale.

Rest position of the feeding dogs 58 and 59 is shown in FIG. 4 in solid lines. When the respective cylinder 63 is actuated to feed one of the blocks 21 or 22 onto the shuttle 23 the respective one of the dogs 58 or 59 engages either both of the open cores in a full-size block 21 or the single core in a half-block 53 and pulls the block forwardly off of the end of its feeding belt 21 or 22 and onto the shuttle 23. The dog 58 or 59 moves across above the shuttle 23 to the position shown in dotted lines in FIG. 4 and the air or hydraulic fluid to the respective cylinder 63 is reversed so that the dog 58 or 59 traverses back across the shuttle 23, being flipped up upon engagement with the wall of the respective block 21 or 22 and the next ready block 21 or 22, which by then has been moved up to the upper end of the respective feeding belt 51 or 52.

The far side rail 50 extends along the shuttle track 24 at a level such that when the feeding dogs 58 and 59 feed the blocks 21 and 22, respectively, onto the shuttle 23, the sides of the blocks engage the side rail 50 in order to align the blocks 21 and 22 on the shuttle 23.

If a wall comprising blocks eight inches thick is being assembled, the strokes of the cylinders 63 are adjusted and the side rails 50 are moved inwardly two inches toward the center line of the shuttle 23 in order that the blocks 21 and 22 will be fed onto the shuttle 23 and against the far side rail 50 to align them in centered position on the shuttle 23.

COURSE SHUTTLE

The course shuttle 23 has a length slightly in excess of the length of one course i.e. slightly greater than the width of a wall panel being constructed. When the shuttle is in unit-receiving position and during the assembly of each individual course on the shuttle 23, its top plate 64 is at the same horizontal level as or just lower than, the off-side of the feeding belts 51 and 52 so that the blocks 21 and 22 will slide on the top plate 64 as they are fed thereon by the feeding dogs 58 and 59. The width of the top plate 64 is less than the minimum width of any wall module to be assembled, for example, eight inches, so that the sides of the blocks extend beyond the sides of the shuttle top plate 64. The plate 64 is supported on the upper end of a web 65 and a lower flange 66 mounts a plurality of rollers 67 which travel on the shuttle track 24 during the loading of the shuttle and which run on the extended shuttle track 35 when a course is being assembled into a wall panel.

In the drawings, the shuttle is indicated as being a length of heavy I-beam to provide the top plate 64, web 65 and lower flange 66. A longitudinally extending rack 68 is cut in or secured to the underside of the top plate 64 and is engaged by a pinion 69 mounted on the output shaft of a speed control mechanism 70 driven by the indexing motor 34. An end stop 71 is fixed at the outboard end of the shuttle 23 to provide a fixed stop against which each course can be assembled and also to insure that after a course has been assembled on the shuttle 23 and the shuttle is energized to move into the panel assembly area, the blocks making up the course will move with the shuttle 23.

The side rails 50 (see particularly FIGS. 1 and 11) are supported by uprights of the overhead frame 29 and are movable from their twelve-inch spacing, as illustrated in the drawings, to an eight inch spacing by pulling pins 72 which extend downwardly through horizontal flanges of the rails 50 and into brackets 73 welded or otherwise secured to the uprights of the frame 29. The rails are then slid inwardly the respective two inches on each side and the pins 72 are reinserted through the horizontal flanges of the rails 50 into inwardly spaced openings in the brackets 73.

The indexing motor 34 is reversible and the speed control 70 also comprises alternatively selectable cams, switches, or the like, by which the distance of movement of the shuttle 23 during course assemb'y and delivery of a complete course is effectively controlled so as to result in correct placement of full size blocks 21 and/or half-size blocks 22, in an assembled course as well as the positioning of a completed course in the clamping and elevating mechanism 37.

INDIVIDUAL COURSE ASSEMBLY

Shuttle Sequence

FIGS. 13–17 are diagrammatic views illustrating the sequence of movement of the shuttle 23 when assembling an intermediate course for a half-bond wall panel utilizing first a half-block 22 followed by a series of full blocks 21 with a final half block 22 at the other end of the course. These figures are not accurate from a dimensional standpoint but are so spaced and set up as to illustrate the sequence of steps to be effected and also to show the simpler sequence of steps through which the shuttle 23 and unit feeding mechanism 20 pass in order to assemble a course consisting entirely of full size blocks 21 for a stack bond panel or for the alternate courses in a half bond panel.

In order to simplify FIGS. 13–17, the assembly of a course comprising two half-size blocks 22 with only two full size blocks 21 is shown. It will be appreciated, of course, that the sequence of steps described for the placement and assembly of the full size blocks 21 in these figures is simply repeated during the placement of a sufficient number of full size blocks 22 to make up either type of course as desired.

In assembling an intermediate half bond course a first, half size block "A" is fed from the unit feeding mechanism 20 onto the shuttle 23. The shuttle is then indexed one and one half lengths (to the left) moving the block "A" to the position indicated in solid lines in FIG. 13. A full size block "B" is then fed onto the shuttle 23. It will be noted that a void for joint "x" is then present between the adjacent end faces of the half block "A" and the full block "B." At this point in time, the joint space "x" is three-quarters of an inch wide, i.e., approximately twice as wide as the three-eighths inch joint which normally is made between blocks of this type in a finished course. This extra spacing results from the actuation of the squeezing mechanism 49 which engages the trailing edge of the block "A" after it has been moved by the shuttle 23 to a position indicated in FIG. 13 by the dotted line designated A'. This position A' is one and one half unit lengths (24 inches) from the initial position of deposition of the block "A" on the shuttle 23. When the block "A" is shifted from the position A' to the position shown in solid lines in FIG. 13, the joint space "x" is opened for the reception of mortar, the block "A" is moved against the shuttle end stop 71, and the joint space "x" is positioned beneath the tubes 90 of the mortar nozzle 33.

Figure 13:
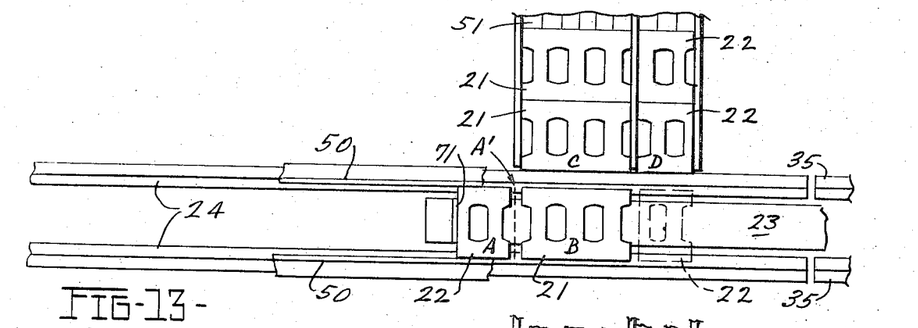
FIGS. 13–17 are sequential, diagrammatic views illustrating the assembly of a single course of units.
Figure 14:
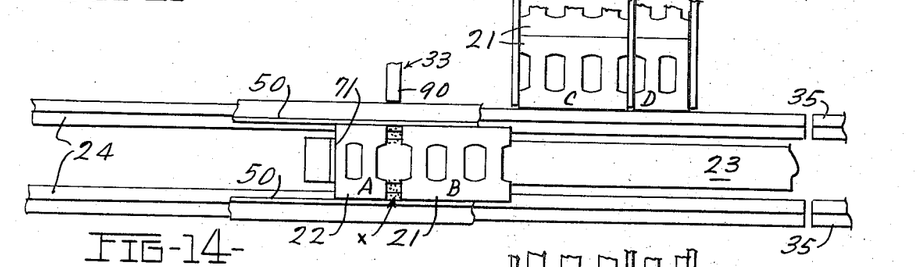

After the joint space "x" has been thus opened to a width of three-quarters inch, the shuttle 23 is again actuated to move one full length forwardly (to the left) from the position shown in FIG. 13 to the position shown in FIG. 14. At this point (FIG. 14) a full size block "C" is fed by its unit feeding belt 51 onto the shuttle 23 and arrives thereon spaced from the previous full size block "B" by three-eighths inch between their adjacent ends, as indicated by the letter "y." In a standard wall, full size blocks would continue to be fed, each being shifted three-eights inch to compress the mortar joint at its front end.

However, in FIGS. 13–16 inclusive, it is assumed that an intermediate course consists only of four blocks, a first half block "A," two full size blocks "B" and "C" and a final half block "D."

Figure 15:
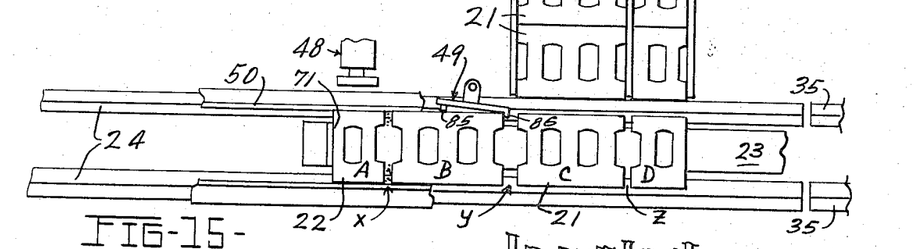
Figure 16:
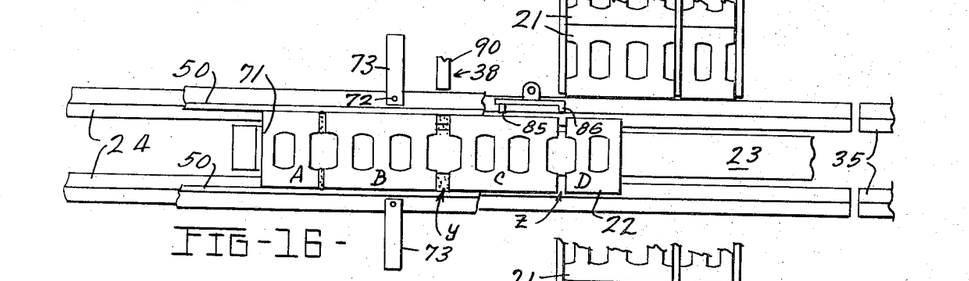

Considering that the full size block "C" is the last full size block in the course to be finished by the half block "D," the blocks "C" and "D" are simultaneously fed onto the shuttle 23 as shown in FIG. 15, and the shuttle 23 is moved one unit distance to the left to the position shown in FIG. 16 to position the joint "y" beneath the mortar nozzle 33.

As each of the joint spaces "x," "y" and "z" is moved to position beneath the mortar nozzle 33, the mortar feeding mechanism 28 is actuated to feed mortar into the then three-quarters inch wide joint. The clamping mechanism 48 is actuated to clamp the preceding block in place and the squeezing mechanism 49 is actuated to close the filled joint (for example, the joint "x") to three-eights inch, re-establishing the unit distance between the rear ends of adjacent blocks. By moving the following blocks ("B") forward (FIG. 14–FIG. 15), the joint space "y" at the rear of the following block "B" is opened to three-quarters inch. After the next indexing of the shuttle 23, this joint space "y" (FIG. 16) is positioned beneath the nozzle 33 and the sequence is repeated.

If, on the other hand, a course is being assembled which consists entirely of full size blocks 21, the entire procedure is a repetitive series of steps which can be observed by comparing FIGS. 13, 14 and 15. Under these conditions, the first block fed would be a full size block which would be fed onto the shuttle 23 at a position spaced three-eighths inch away from the end stop 71. The shuttle 23 would then be indexed one full block length, moving this block to the position of block "B" relative to the belt 51 and the mortar nozzle 33, in FIG. 14. Because this would be the first block in the course, no mortar would be fed at that time. The second full size block "C" would then be fed onto the shuttle 23, its left end being spaced only three-eighths inch from the right end of the block "B." The squeezing mechanism 49 would then be actuated moving block "B" to the position indicated in FIG. 15 and opening the joint space between blocks "B" and "C." The shuttle 23 would then be indexed one full block length moving blocks "B" and "C" to position illustrated in FIG. 16. Mortar would be injected into joint space "y." A subsequent full size block would be fed into the position of block "B" in FIG. 13. Block "C" would be shifted laterally to close joint "y" and open joint space "z" and the shuttle would then again be indexed a full block length. When a course consisting entirely of full size blocks is being assembled on the shuttle 23, the shuttle indexing mechanism need only move one full length for each block with the joint spaces being successively opened and closed by the actuation of the squeezing mechanism 49 subsequent to each deposition of mortar into a joint space between adjacent ends of blocks. It is only when half blocks are involved, as in the assembly diagrammatically illustrated in FIGS. 13–17, that the shuttle indexing mechanism must be moved forwardly one and one half unit lengths first, in order to move the first half block 22 to position for engagement by the squeezing mechanism 49.

The diagrammatic sketches of FIGS. 13–17 are not drawn to scale. The adjacent edges of the two block feeding belts 51 and 52 actually are spaced only three-eighths inches from each other so that the full size blocks 21 and the half size blocks 22 are deposited on the shuttle 23 at three-eighths inch spacing between their adjacent edges.

Squeezing Mechanism

The squeezing mechanism 49 is illustrated in FIGS. 9-12, inclusive, as it functions to open and close the respective inter-block joints for the reception of head mortar and for establishing the unit distance of sixteen inches between corresponding end faces of adjacent blocks or the half unit distance of eight inches, when a half block is involved.

The squeezing mechanism 49 comprises a short stroke pneumatic cylinder 74 positioned above the shuttle 23 adjacent the unit feeding mechanism 20 so that after each full size block 21, for example, has been fed onto the shuttle 23 and the shuttle has been indexed one distance, that block reaches the position where it can be squeezed against a preceding block by the mechanism 49. The cylinder 74 has a piston 75 pivotally yoked at its front end to a pair of oppositely extending bell cranks 76. Each of the bell cranks 76 is pivoted on a sliding collar 77 and each of the collars 77, in turn, is mounted on a short horizontal rod 78. The rods 78 are carried by ear 79.

Considering that a wall of twelve inch thick blocks is being assembled, a dog bar 80 is pivotally mounted on the free end of each of the bell cranks 76 by a split yoke 81 which embraces the arm of the bell crank 76 and is retained thereon by a removable vertical pin 82.

When a narrower wall is being assembled (see FIG. 12) a similar dog bar 83 is placed on each of the free arms of the bell cranks 76, the difference between the dog bar 80 for twelve inch blocks and the dog bar 83 for eight inch blocks, being solely the length of the split yoke 81 (12 inch blocks) or 84 (8 inch blocks). Determined by the thickness of the wall being assembled, of course, the particular dog bar 80 or 83 is positioned simply by the removal and reinsertion of retaining pin 82.

Figure 9:
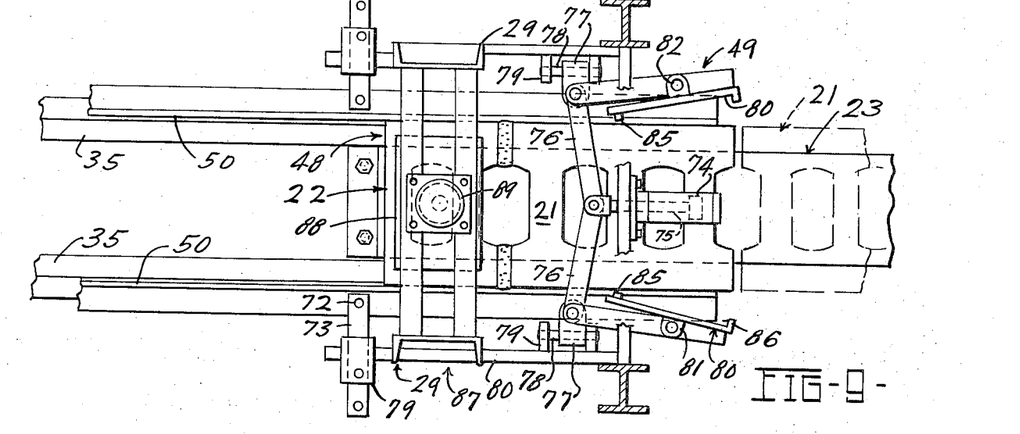
FIG. 9 is a fragmentary, horizontal sectional view illustrating the mechanism for assembling individual blocks or units in a single course and for assuring that each course is of the same length.
Figures 10, 11, 12:
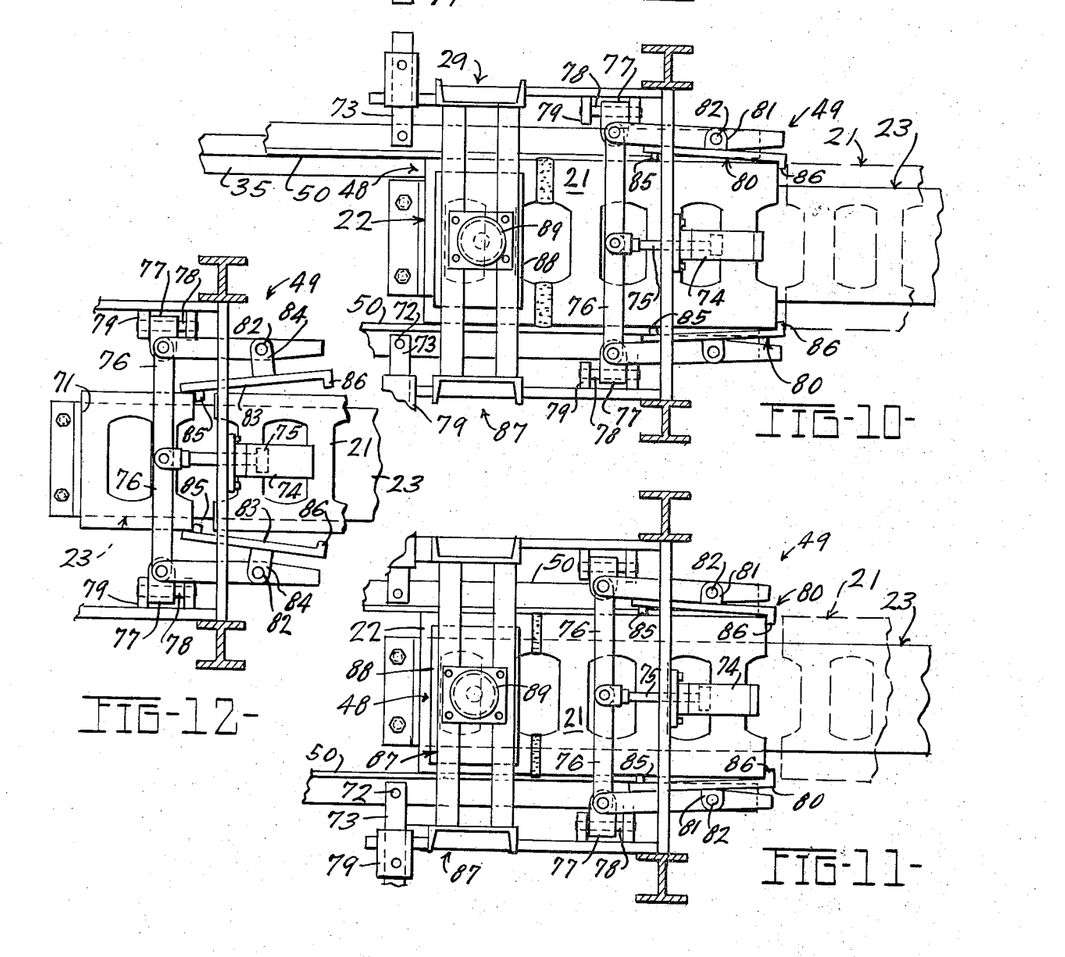
FIG. 10 is a view similar to FIG. 9 but showing the mechanism in a second position.
FIG. 11 is a view similar to FIG. 10 but showing the mechanism in yet another position.
FIG. 12 is a fragmentary view showing how the mechanism of FIGS. 9–11 is modified to assemble walls from units of less thickness, say eight inches.

When the cylinder 74 is actuated, its rod 75 is thrust outwardly, moving from the position illustrated in FIG. 9 to the position illustrated in FIG. 10. This swings the bell cranks 76, moving their free arms inwardly to engage the dog bar 80, for example, with a block on the shuttle in this position. If the block on the shuttle at this point is a full-size block 21 (for example the block "B" of FIG. 14 or FIG. 9), a "half-block" dog 85 strikes the side of the particular block "B" so that completion of this movement pivots the dog bar 80 on the pin 82 and swings a "full block" dog 86 into the joint space "y" to engage the trailing end of the block "B" and to shift it forwardly as the piston rod 75 continues to be extended by its cylinder 74 from the position illustrated in FIG. 10 to the position illustrated in FIG. 11. This shift or squeeze of the block "B" closes the joint space "x" into which mortar has previously been placed by the mortar feeding mechanism 28 and opens the joint space "y" between the trailing edge of the block "B" and the leading edge of the following block "C."

The position of the half-block dogs 85 and full block dogs 86 relative to the trailing edge of a previous block "A" is such that when the squeezing mechanism 49 is actuated the respective block "B" is moved three-eighths inch to close the mortar joint "x" to three-eighths and thus to re-establish the sixteen inch modular spacing between the corresponding ends of the blocks "A" and "B."

If the particular block in position to be moved by the squeezing mechanism 49 is a half block (see FIG. 12), then when the squeezing mechanism 49 is actuated, and the bell cranks 76 are swung from the position illustrated in FIG. 9 to the position illustrated in FIG. 12 the half block dogs 85 drop into the respective mortar joint space as it is shown in FIG. 12. When the actuation of the squeezing mechanism 49 is completed, the half block (FIG. 13) is moved three-eighths inch to open the mortar joint "x" between it and the following full block and to position the half block against the end stop 71 on the shuttle 23.

Figure 17:
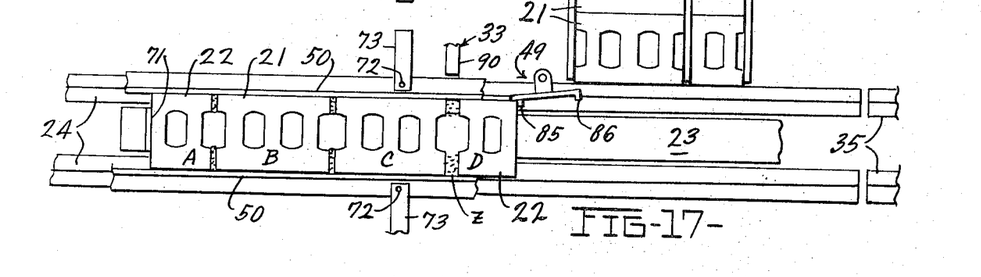

Similarly, when a half block is placed at the end of a course, (FIG. 17) the half block dog 85 engages the trailing edge of the final half block "D" to close the mortar joint indicated as "z" in FIG. 17.

Block Clamping Mechanism

With reference to FIGS. 9-11 and 15, the block clamping mechanism 48 comprises a bridge 87 extending across above the path of the shuttle 23 and so positioned relative to the squeezing mechanism 49 that a pad 88 of the mechanism 48 can be thust downwardly by its actuating cylinder 89 to clamp a next preceding block in position when a successive block is being squeezed forwardly by the squeezing mechanism 49 in order to reduce one of the joint spaces from the open distance of three-quaters inch into which mortar is fed, to a finished width of only three-eighths inch.

Mortar Feeding Mechanism

The mortar feeding mechanism 28 serves two functions in an apparatus according to the invention:

(1) It deposits the head joint mortar into the successive mortar spaces (for example, the mortar spaces "x" of FIG. 9, "y" of FIG. 16, or "z" of FIG. 17) when these interblock mortar spaces are located beneath spaced narrow tubes 90 of the motar nozzle 33 (see FIGS. 6-8, inclusive). The two tubes 90 are spaced from each other transversely such distance that mortar delivered from their lower ends into the head joint mortar spaces, is spread on the adjacent faces of the blocks along the outer margins as shown, for example, in FIGS. 7 and 14.

(2) The mortar mechanism also spreads two continuous, narrow ribbons of mortar along the sides of the upper surfaces of the blocks after a course has been completely assembled on the shuttle 23 while the shuttle 23 is moving into position beneath the clamping and elevating mechanism 37.

With reference to FIG. 17, after the "z" joint has been closed by the action of the squeezing mechanism 49, the shuttle 23 would be indexed to the left at least one half block length to carry the final half block beyond the mortar nozzle 33. When the shuttle is being driven from its fully loaded position (at the left in FIG. 1) into the space beneath the clamping and elevating mechanism 37 (as shown in FIG. 3), the mortar mechanism 28 is energized to spread the two strips of mortar on the top of the course to form a bed joint.

The mortar feeding mechanism 28 (see FIGS. 7 and 8) comprises the hopper 30 and feed screw 31 and the mortar chute 32, including a down spout 91 which terminates in an open rectangular bottom end 92 telescoped into the interior of a rectangular box 93 at the lower end of which is the mortar nozzle 33 consisting of the two tapered tubes 90. The entire mortar feeding mechanism 28 is supported from the uprights of the overhead frame 29 by suitable braces 94 and vertical ways 95. The movable lower box 93 has outwardly extending guide bars 96 which travel in the ways 95. Vertical movement of the box 93 and the tubes 90 is effected by a cylinder 97 carried by the stationary bottom end 92 of the down spout 91. A rod 98 of the cylinder 97 is attached to the vertically movable box 93 and the tubes 90 so that when it is desired to spread the two runs of head joint mortar, the tubes 90 are first thrust downwardly into the joint space between adjacent blocks and then, as they are withdrawn, mortar is fed from the tubes 90 to spread the head joints.

Flow of mortar from the tubes 90 depends not only upon the feeding screw 31 which supplies the motor to the down spout 91 but also is effected by a pair of vibrator actuated probes 99 mounted in vibrators 99' on the movable mortar box 93 and extending down into the tubes 90 which are energized at the time the tubes begin to be drawn upwardly from their lower most position.

The uppermost position of the nozzle 33 (when the cylinder 97 has withdrawn its rod 98) positions the lower ends of the tubes 90 at a level, say, one-half inch or three-eighths inch above the upper surface of the blocks on the shuttle 23 and, after the course has been completed, the vibrator probes 99 and the screw 31 are re-energized so that as the shuttle 23 carries a full course of blocks from the position slightly to the left of that shown in FIG. 17, into and beneath the clamping and elevating mechanism 37, twin ribbons of mortar are spread on the upper surfaces of the blocks to form the bed joint. These ribbons of mortar can best be seen in FIGS. 4 and 5 where the course shuttle 23 with a course of full-size blocks 21 is shown in position beneath the clamping and elevating mechanism 37 ready to be moved upwardly, to become the lowermost course of a wall panel being assembled.

Clamping and Elevating Mechanism

As described briefly above, the clamping and elevating mechanism 37 comprises a stationary clamp 38 which, in this embodiment of the apparatus, is a heavy beam extending along above and parallel to the second shuttle guide track 35. The beam 38 is bolted down to the inner ends of cantilever support beams 100 in either of two positions, viz: in an outwardly spaced position (see FIG. 5) for the accommodation of wall sections twelve inches thick or in a second position spaced inwardly therefrom two inches to accommodate blocks eight inches thick. The heavy beam forming the stationary base clamp 38 establishes the base plane for the wall unit being constructed and a plurality of upwardly extending posts 101 are erected above and on the base clamp 38 to keep the wall panel in planar condition while it is being assembled.

The movable side clamp 39 is also a massive beam extending the full length of the clamping and elevating mechanism and mounted on the inner end of screws 102 of the several clamping jacks 40. All of the clamping jacks 40 are simultaneously actuated by a longitudinally extending power shaft 103 driven by a clamping motor 104. The clamping jacks 40 have a sufficient travel distance in order to close both to close to a space of eight inches from the stationary side clamp 38 or the distance of twelve inches therefrom when the twelve inch blocks are being assembled. The clamping jacks 40 are closed against a course of blocks at all times except after a newly assembled individual course has been moved into position in the clamping and elevating mechanism 37, has been raised into contact with the under surface of a preceding course and the bed joint mortar run has been squeezed down to three-eighths inch.

The clamping and elevating mechanism 37 also comprises the elevating jacks 42 with their drive and cross shafts 43 and 44 and the cross beams 41 upon which the second shuttle track 35 is supported (see FIG. 4).

After an individual course has been assembled on the shuttle 23 and the bed joint mortar has been spread over the top surfaces of the blocks in that course as the shuttle 23 moves into position beneath the clamping and elevating mechanism 37, the indexing motor 34 is stopped and the shuttle 23 is positioned properly longitudinally beneath the previously assembled courses of a wall panel. At this point the elevating jacks 42 are driven to raise the entire shuttle supporting mechanism and the new course of blocks upwardly until the two ribbons of bed joint mortar contact the under surface of a preceding course. The elevating jacks 42 continue to raise the new course until the bottom surface of the new course is spaced a unitary distance below the bottom surface of a previous course. This distance usually is eight inches. This also closes the horizontal joint between the successive courses to a thickness of three-eighths inch. At this point in time, the clamping jacks 40 open so that the entire group of previously assembled courses now rests on the shuttle 23. The clamping jacks 40 are further actuated to raise the new course and the previously assembled courses upwardly until the new course reaches the desired level between the stationary side clamp 38 and the movable side clamp 39. The clamping jacks 40 are then closed again to tightly engage the new course to hold the partially assembled panel in its upper position and the elevating jacks 42 are returned to their lowermost position, relowering the shuttle to the loading level, as shown in FIG. 4 for the subsequent assembly of a following course of blocks on the shuttle 23.

As each individual course of blocks is completed on the shuttle 23 and moved into position within the clamping and elevating mechanism 37, each successive course is brought upwardly into contact with the lower edge of the wall panel being assembled until a completed wall panel is supported by the clamping jacks 40 whereupon the panel can be removed for final curing or cartage to a location of use.

What I claim is:

1. An apparatus for fabricating modular wall sections from rectangular building blocks, said apparatus comprising, in combination,
    a. horizontal course assembly shuttle having a length at least as long as a course of the wall section being fabricated,
    b. means mounting said shuttle for longitudinal horizontal movement along a horizontal path,
    c. a block supply mechanism for moving individual blocks laterally onto said shuttle,
    d. means adjacent said shuttle for feeding mortar into interblock head joint spaces,
    e. means for moving said shuttle in one direction intermittently past said block supply mechanism and said mortar feeding means, in steps of nominal block length, and for moving said shuttle in the opposite direction for delivering a completed course to a wall assembly area.

2. An apparatus according to claim 1 which further includes a guide rail extending along the side of the course shuttle against which the block supply mechanism positions the blocks for establishing a vertical face plane for the blocks in each course.

3. An apparatus according to claim 1 in which the block supply mechanism comprises at least one supply conveyor leading to a point adjacent the path of the shuttle and a device for moving blocks one at a time off of said conveyor and onto said shuttle which is actuated immediately after each intermittent movement of said shuttle.

4. An apparatus according to claim 1 in which the mortar feeding means comprises nozzles, means for moving said nozzles into and out of the interblock head joint spaces between the ends of adjacent blocks on the shuttle, means for feeding mortar out of said nozzles and onto the ends of such adjacent blocks while said nozzles are being moved out of such spaces, and means for closing the interblock head joint spaces on the mortar to establish a predetermined head joint mortar width.

5. An apparatus according to claim 4 in which the mortar nozzles are positioned at a level just above the top surfaces of the blocks on the shuttle and the mortar feeding mechanism is energized to feed mortar out of said nozzles onto the top surfaces of said blocks while the said shuttle is moving the completed course to the wall assembly area.

6. An apparatus according to claim 1 in which the block supply mechanism moves each successive block onto the shuttle with the trailing edge of such block spaced a nominal block length from the trailing edge of the next preceding block.

7. An apparatus according to claim 1 in which the means mounting the shuttle comprises a first horizontal guide track extending generally along said horizontal path below the block supply mechanism and the mortar feeding means, and means on said shuttle supporting said shuttle for movement along said track.

8. An apparatus according to claim 7 further including wall assembly means comprising (1) a second track longitudinally aligned with the first track, (2) an elevator on which said second track is mounted, (3) elevator mechanism for lifting said elevator, said track, the shuttle and a course of blocks thereon upwardly a distance equal to the height of a course and (4) clamping mechanism including members extending along above and on opposite sides of said second track for clamping each successive course of blocks in elevated position for supporting such course and previously assembled courses above the level of the upper surface of a subsequent course on said shuttle and elevator.

9. An apparatus according to claim 1 wherein the mortar feeding means further includes means for individually shifting each of said blocks on said shuttle relative to the following block for widening such head joint space therebetween and relative to the preceding block for restoring such head joint space to nominal width after deposition of mortar into such space.

10. An apparatus according to claim 9 in which the block supply mechanism moves each successive block onto the shuttle with the trailing edge of such block spaced a nominal block length from the trailing edge of the next preceding block, and in which the block shifting means moves each successive block relative to the shuttle and to the preceding and following blocks a distance equal to the nominal interblock head joint space in a finished course whereby the head joint space between the block being shifted and the preceding block is restored to nominal spacing and the head joint space between the block being shifted and the following block is widened to twice nominal spacing.

11. An apparatus according to claim 9 further including a clamping means which clamps each proceeding block in place on the shuttle while the following block is being shifted by said block shifting means.

12. An apparatus according to claim 9 in which the block shifting means includes means for engaging the trailing edges of full length and half length blocks as such blocks are moved to position on said shuttle.

References Cited
UNITED STATES PATENTS

| | | | |
|---|---|---|---|
| 3,231,646 | 1/1966 | Conder et al. | 52—749 |
| 3,350,833 | 11/1967 | Larger | 52—749 |
| 3,371,459 | 3/1968 | Thomas et al. | 52—749 |
| 3,585,092 | 6/1971 | Storer | 156—182 |

DOUGLAS J. DRUMMOND, Primary Examiner

M. G. WITYSHYN, Assistant Examiner

U.S. Cl. X.R.

52—747, 749; 156—182, 559